United States Patent
Lee

(10) Patent No.: US 11,297,700 B2
(45) Date of Patent: Apr. 5, 2022

(54) SYSTEM AND METHOD FOR PROVIDING INFRARED INTERIOR LIGHTING FOR AN AIRPLANE VIDEO SURVEILLANCE SYSTEM

(71) Applicant: The Boeing Company, Chicago, IL (US)

(72) Inventor: Donald B. Lee, Seattle, WA (US)

(73) Assignee: The Boeing Company, Chicago, IL (US)

( * ) Notice: Subject to any disclaimer, the term of this patent is extended or adjusted under 35 U.S.C. 154(b) by 271 days.

(21) Appl. No.: 16/147,395

(22) Filed: Sep. 28, 2018

(65) Prior Publication Data

US 2020/0107419 A1   Apr. 2, 2020

(51) Int. Cl.
| | | |
|---|---|---|
| *H05B 45/00* | (2020.01) | |
| *H05B 45/20* | (2020.01) | |
| *B64D 47/04* | (2006.01) | |
| *B64D 45/00* | (2006.01) | |
| *B64D 47/08* | (2006.01) | |
| *H05B 45/10* | (2020.01) | |

(52) U.S. Cl.
CPC ......... *H05B 45/20* (2020.01); *B64D 45/0015* (2013.01); *B64D 47/04* (2013.01); *B64D 47/08* (2013.01); *H05B 45/10* (2020.01); *B64D 45/0053* (2019.08); *B64D 2203/00* (2013.01)

(58) Field of Classification Search
CPC .... B64D 47/04; B64D 45/0015; B64D 47/08; H05B 45/20; H05B 45/10
See application file for complete search history.

(56) References Cited

U.S. PATENT DOCUMENTS

| | | | |
|---|---|---|---|
| 2004/0090787 A1* | 5/2004 | Dowling | H05B 47/18 362/464 |
| 2010/0141153 A1* | 6/2010 | Recker | H05B 33/0803 315/149 |
| 2014/0307447 A1* | 10/2014 | Ohta | F21K 9/60 362/311.02 |
| 2014/0334137 A1* | 11/2014 | Hasenoehrl | H01L 25/0753 362/147 |
| 2019/0182930 A1* | 6/2019 | Broers | H05B 47/11 |

* cited by examiner

*Primary Examiner* — Gerald J Sufleta, II

(57) ABSTRACT

Systems and methods for illuminating an airplane cabin using a light strip comprising a plurality of spectrally-tuned illuminators within a housing are provided. The illuminators include a first visible light illuminator and an infrared illuminator. The light strip is disposed to provide indirect infrared illumination of the cabin via diffuse reflection from a surface of the cabin (wash lighting) from a shrouded location. The illuminators include light emitting diodes (LEDs), and include white and some combination of red, yellow, green, and blue. A controller varies intensities of each illuminator, to emphasize or de-emphasize various colors or infrared illumination throughout an interior of the airplane cabin.

20 Claims, 7 Drawing Sheets

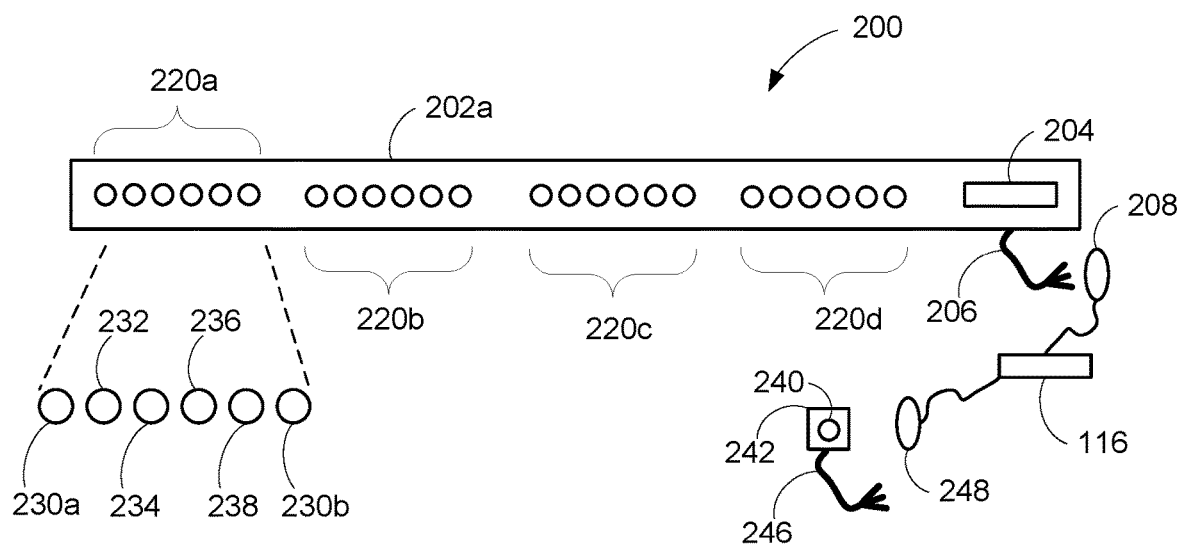
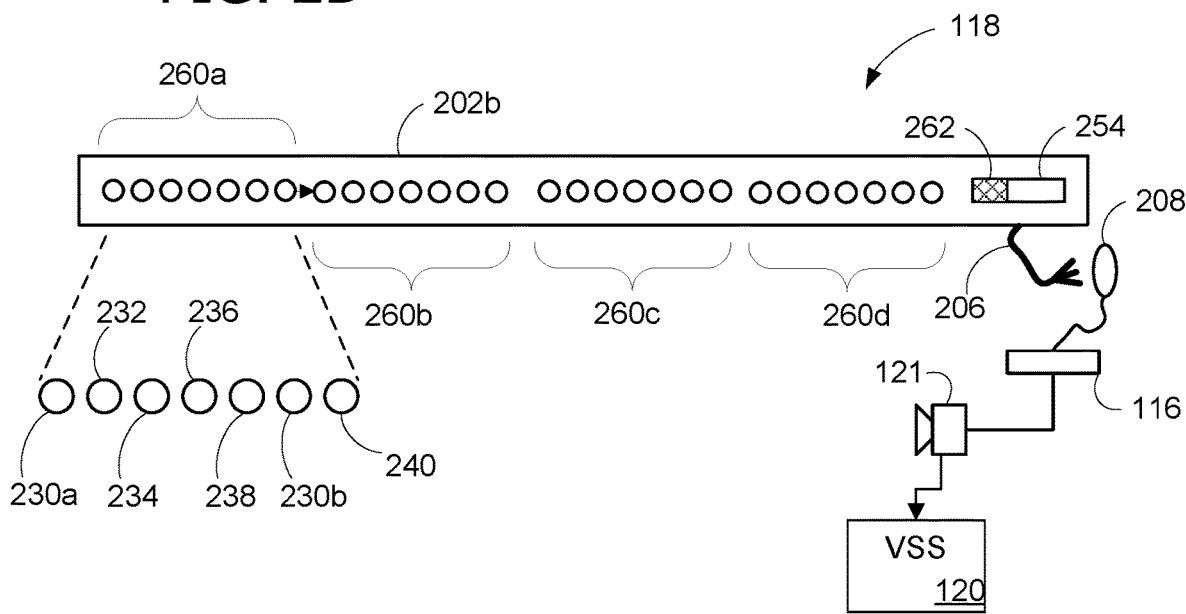

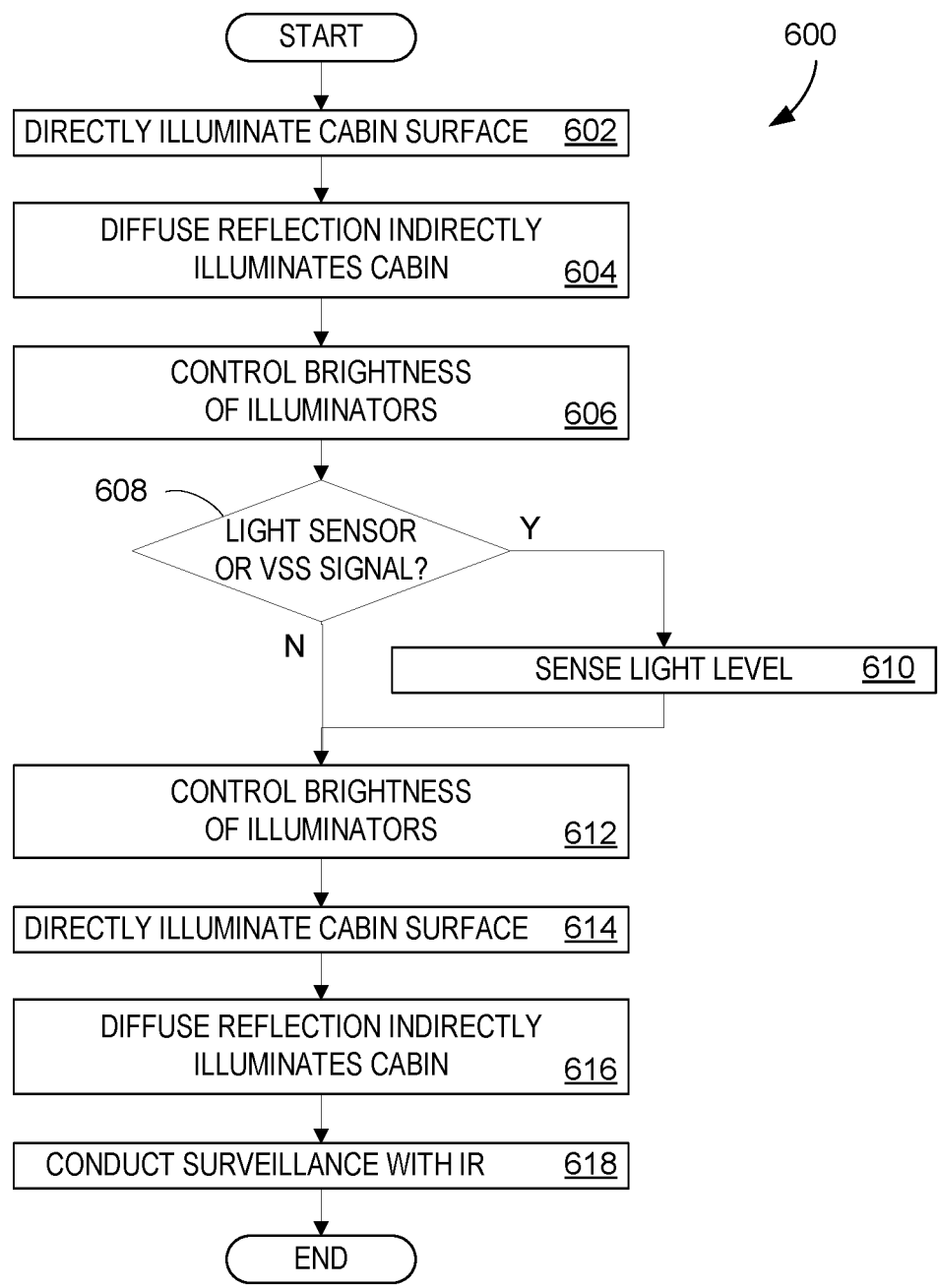

SYSTEM AND METHOD FOR PROVIDING INFRARED INTERIOR LIGHTING FOR AN AIRPLANE VIDEO SURVEILLANCE SYSTEM

BACKGROUND

Airplane interior lighting needs to accommodate not only needs of passengers in a confined location, but also video surveillance systems. For example, at some time, bright illumination may be needed to permit passengers to safely embark and disembark, while at other times, dimmer illumination may be preferable to permit passengers to sleep or relax. However, in confined locations such as an airplane cabin, areas available for placement of lighting are often restricted, resulting in limited options.

Airplane video surveillance systems (VSS) use infrared (IR) cameras that are sensitive to both visible light and IR light to create a video image. Thus, IR illumination is used to permit collection of imagery during low visible light and no visible light conditions. It is common for some IR cameras to include IR illuminators to enable visibility during low visible lighting conditions. Thus, current IR illumination solutions are not easily expanded due to limited interface ports, wiring installation, certification concerns, and cost. Additionally, IR light emitting diodes (LEDs) produce a faint red light that can be visible to cameras and to the human eye and thus distracting or annoying for passengers.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects and examples disclosed herein are directed to a system for illuminating an airplane cabin with indirect lighting. The system includes a light strip with a plurality of illuminators within a housing, wherein the plurality of illuminators comprises a first set of spectrally-tuned illuminators, and wherein the first set of spectrally-tuned illuminators comprises a first visible light illuminator and an infrared illuminator. The light strip is disposed to provide indirect visible and infrared illumination of the cabin via diffuse reflection from a surface of the cabin from a shrouded location.

BRIEF DESCRIPTION OF THE DRAWINGS

The disclosed examples are described in detail below with reference to the accompanying drawing figures listed below:

FIGS. 2A and 2B illustrate various light strip configurations that can be employed in the system shown in FIG. 1 and an airplane cabin shown in FIG. 3.

FIG. 6 is a flow chart illustrating an exemplary operation of the lighting system shown in FIG. 1 using the light strip configurations of FIGS. 2A and 2B.

Corresponding reference characters indicate corresponding parts throughout the drawings.

DETAILED DESCRIPTION

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

In order for an airplane video surveillance system (VSS) to operate in low light conditions, IR illuminators provide additional infrared (IR) cabin illumination for VSS cameras. Systems and methods are disclosed herein for illuminating a cabin of a vehicle (e.g., an airplane) using a light strip having a plurality of spectrally-tuned illuminators within a housing, wherein the illuminators include at least a first visible light illuminator and an IR illuminator. The light strip is disposed to provide indirect IR illumination of the cabin via diffuse reflection from a surface of the cabin (wash lighting) from a shrouded location (e.g., a location that conceals the light strip from view). The illuminators can include light emitting diodes (LEDs), and include one or more IR LEDs, white LEDs, and some combination of red, yellow, green, and blue LEDs (e.g., colored LEDs). A controller is provided to vary intensities of the different illuminators, to emphasize or de-emphasize various colors or IR illumination.

IR enabled light strips described herein, which are augmented with one or more IR illuminators, can advantageously provide indirect IR illumination throughout a cabin interior. The IR light strips enable IR illuminator installation without a need for standalone IR illuminators or modification of the airplane interior that would be needed for conventional new illuminator placement. The IR enabled light strips may utilize the same mounting and footprint as light strips that currently exist in the cabin, and can thus render installation and retrofit much easier, faster, and at a reduced cost than conventional lighting systems as the IR enabled light strips fit within an existing lighting shroud. In particular, an existing lighting strip that do not include an IR illuminator can be upgraded to an IR enabled light strip that includes an IR illuminator via a plug-n-play replacement given that a housing for the IR enabled light strip has a same form factor as the existing light strip. Thus, the IR enabled light strips as described herein provide a viable option for both new airplanes and retrofit installations. In addition, by replacing conventional light strips with the IR enabled light strips described herein, the IR enabled light strips can be controlled by the same controller that controlled the existing (e.g., current) light strips, thus reducing costs for implementing entirely new software or controllers as well as reducing time as additional programming is reduced significantly.

Figure 1:
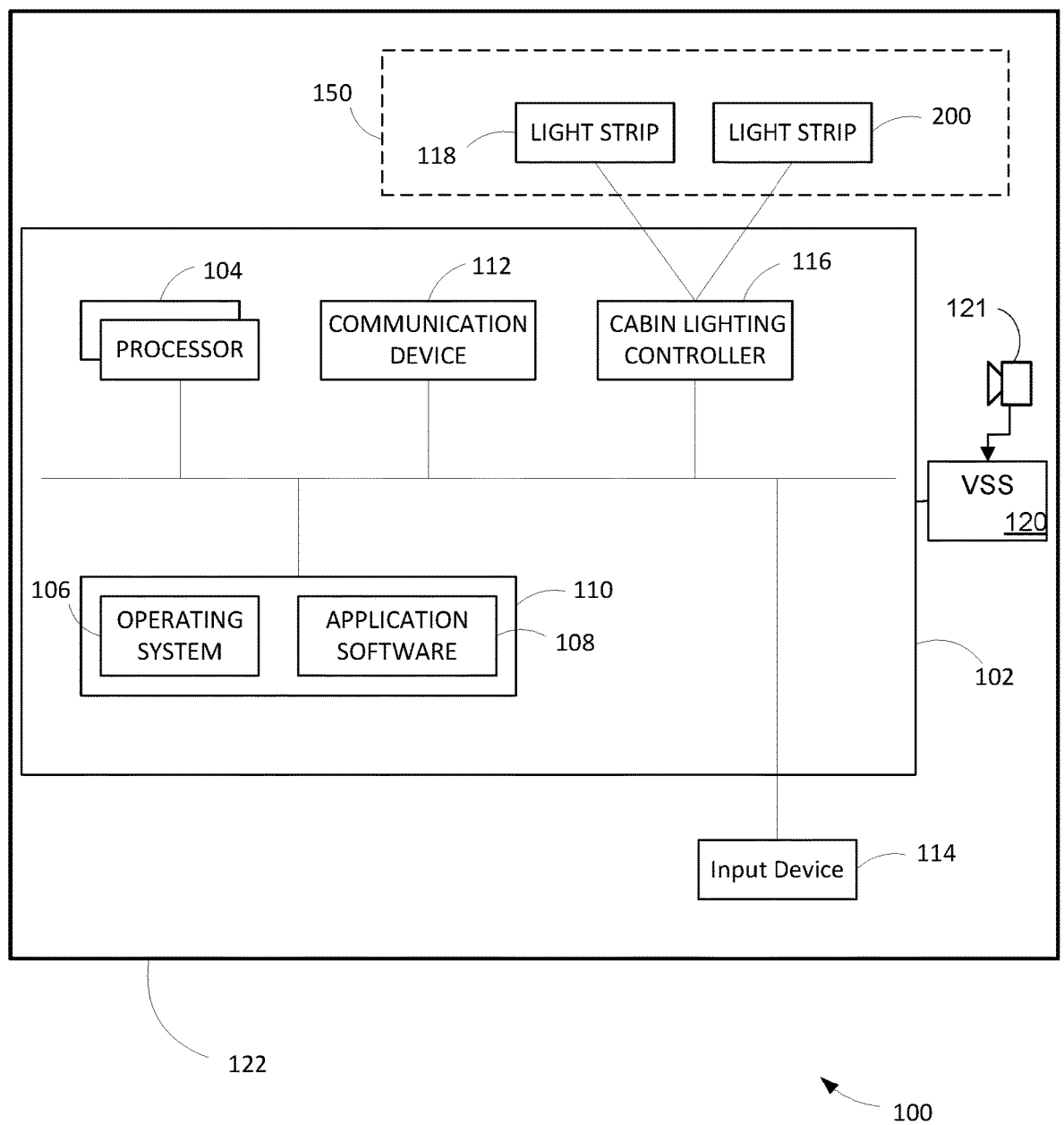
FIG. 1 illustrates a block diagram of a system for controlling interior lighting for an airplane video surveillance system (VSS) that can be used, for example, to implement at least a portion of the operation depicted in FIGS. 6 and 7.

FIG. 1 illustrates a block diagram of a system 100 that includes a computing apparatus 102 that controls a lighting system 150 to illuminate an interior of a cabin 122 for an airplane video surveillance system (VSS) 120 that includes a VSS camera 121. While the computing apparatus 102, lighting system 150, and VSS 120 are all shown within the cabin 122, aspects of the present disclosure enable one or more components of the computing apparatus 102 and VSS 120 to be located outside of the cabin 122 in a different location of the airplane or on a remote server (e.g. a cloud-based server). In some configurations, the VSS camera 121 is coupled to the cabin lighting controller 116, which detects when the VSS camera 121 needs a particular amount of illumination and controls the IR illumination level according to the needs of the VSS camera 121.

The computing apparatus 102 comprises one or more processors 104 which may be microprocessors, controllers or any other suitable type of processors for processing computer executable instructions to control the operation of the electronic device. Platform software comprising an operating system 106 or any other suitable platform software may be provided on the computing apparatus 102 to enable application software 108 to be executed on the computing apparatus 102. According to an embodiment, control of indirectly illuminating the interior of the cabin 122 with IR light via diffuse reflection from a surface of the cabin 122 from light strips 118 and 200 disposed in a shrouded location and controlling a brightness of each of a plurality of LEDs in the light strips 118 (including one or more IR LEDs) may be accomplished by software.

Computer executable instructions may be provided using any computer-readable media that are accessible by the computing apparatus 102. Computer-readable media may include, for example, computer storage media such as a memory 110 and communications media. Computer storage media, such as the memory 110, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 110) is shown within the computing apparatus 102, it will be appreciated by a person skilled in the art, that the storage may be distributed or located remotely and accessed via a network or other communication link (e.g. using a communication device 112).

The computing apparatus 102 comprises a cabin lighting controller 116 configured to output information to one or more of the light strips 200 and 118, which are described in more detail with reference to FIGS. 2A and 2B. The cabin lighting controller 116 may also be configured to receive and process an input from input device 114, for example, a keyboard, a microphone, a touchpad, or a touch sensitive display. The cabin lighting controller 116 may also output data to devices other than the light strips 118, e.g. other computing apparatus, and remote devices/servers. In some embodiments, a user provides input to the input device 114, for example to control a lighting level in the cabin 122. In some examples, the computing apparatus 102 detects voice input, user gestures or other user actions and provides a natural user interface (NUI).

NUI technology enables a user to interact with the computing apparatus 102 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, IR camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus 102 is configured by the program code when executed by the one or more processors 104 to execute the embodiments of the operations and functionality described, for example, as described in the other figures. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (PSSPs), System-on-a-chip systems (SOCs), Complex Programmable Logic Devices (CPLDs), Graphics Processing Units (GPUs).

Figure 3:
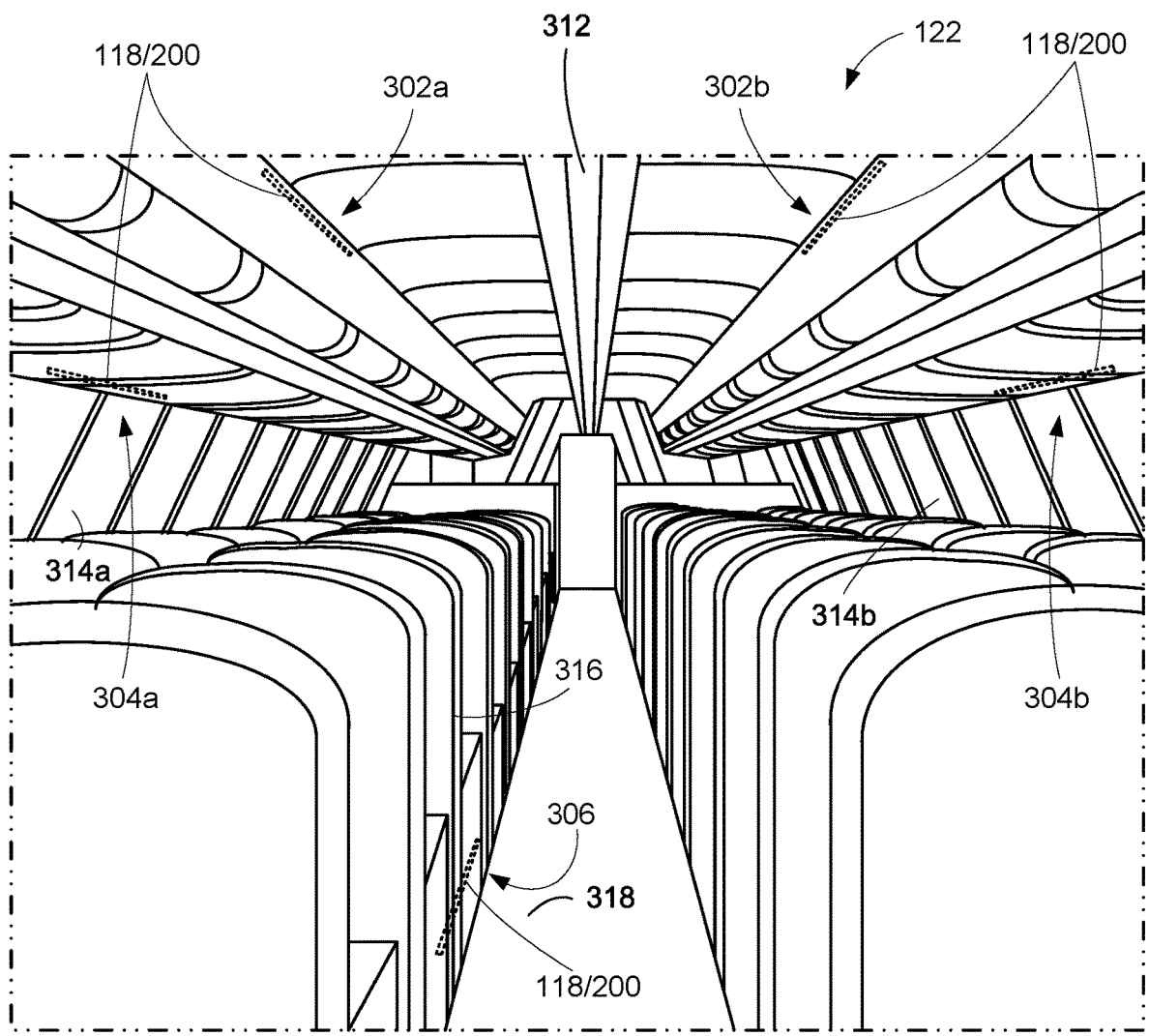
FIG. 3 is an illustration of the airplane cabin shown in FIG. 1 that can advantageously employ augmented interior lighting for an airplane VSS.

FIGS. 2A and 2B illustrate various light strip configurations that can be employed in the cabin 122 shown in FIG. 1 and further shown in FIG. 3. FIG. 2A illustrates a light strip 200 having a housing 202A and a plurality of sets of spectrally-tuned illuminators (e.g., 220*a*, 220*b*, 220*c*, and 220*d*), but no IR illuminator is included within the housing 202A. The light strip 200 has a first set of spectrally-tuned illuminators 220*a*, a second set of spectrally-tuned illuminators 220*b*, a third set of spectrally-tuned illuminators 220*c*, and a fourth set of spectrally-tuned illuminators 220*d*. In the light strip 200, each set of spectrally-tuned illuminators has a same spectral coverage (e.g., a range of wavelengths). For clarity, only the first set of spectrally-tuned illuminators 220*a* is illustrated in more detail. The first set of spectrally-tuned illuminators 220*a* comprises a white light illuminator 230*a*, a red light illuminator 232, a yellow light illuminator 234, a green light illuminator 236, a blue light illuminator 238, and another white light illuminator 230*b*. Thus, the first set of spectrally-tuned illuminators 220*a* comprises a plurality of visible light illuminators having differing colors, which in some examples, comprise LEDs.

As shown in FIG. 2A, the light strip 200 has an on-board controller 204 and a wire harness 206 that couples to a connector 208 that is, in turn, coupled to the cabin lighting controller 116 shown in FIG. 1. The cabin lighting controller 116 controls lighting intensity and hue for the light strip 200 and other light strips in an airplane cabin, for example, the cabin 122 of FIG. 1. The cabin lighting controller 116 can be a microcontroller and/or includes one or more processors that are configured to control operations described herein, such as to control the timing, color, and intensity of LED lights lighting effects emitted from light strips (e.g., light strip 200 and also light strip 118 of FIG. 2B). The cabin lighting controller 116 controls the operations of the light strips 200 and/or the light strips 118 based on designated sets of instructions stored in memory (e.g., the memory 110 shown in FIG. 1). In one embodiment, the designated sets of instructions are modified to enable control of an IR illuminator when a light strip that does not include an IR illuminator is updated to be coupled to an IR illuminator (e.g., the light strip 200 coupled to the IR illuminator 240) or is replaced with a light strip that includes an IR illuminator (e.g., the light strip 118). The cabin lighting controller 116 is configured to execute a set of instructions stored in one or more data storage units or elements (such as one or more memories included within or connected to the cabin lighting controller 116, such as the memory 110). The data storage units may also store data or other information as desired or needed. The data storage units may be in the form of an information source or a physical memory element within a processing machine.

With continued reference to FIG. 2A, the on-board controller 204 can also control a brightness and hue of light strip 200, for example, by using pulse width modulation (PWM). The on-board controller 204 receives control signals from the cabin lighting controller 116 through the connector 208 and the wire harness 206, which can also supply electrical power. For example, the light strip 200 can be powered by DC voltage from a power source (not shown). The wire harness 206 can also be flexible wires, or instead be a rigid connector that fits into the connector 208 when the housing 202A of the light strip 200 is installed in place. In some examples, the housing 202A can be flexible, such as a rope light.

Figure 4A:
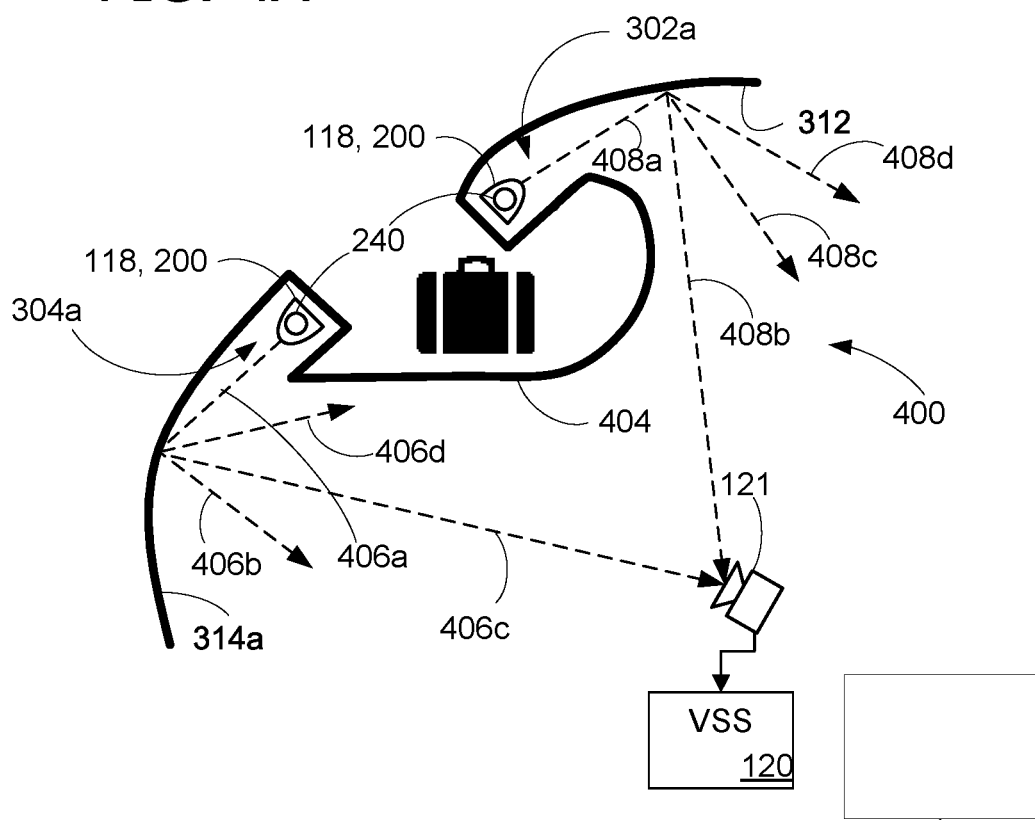
FIGS. 4A and 4B illustrate various exemplary shrouded locations for locating illuminators for indirect illumination that can be employed in the airplane cabin of FIG. 3.
Figure 4B:
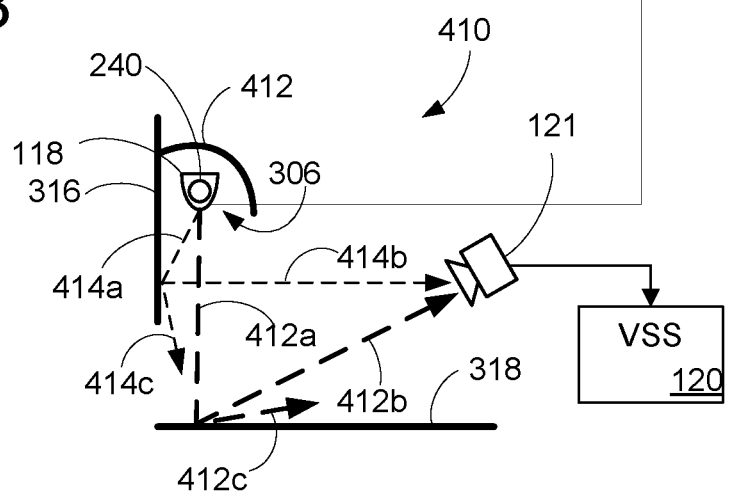

FIG. 2A further illustrates a housing 242 that is separate from the housing 202A for the light strip 200. An IR illuminator 240, installed in the housing 242, also has a separate wire harness 246, which is coupled to another connector 248, in order to receive power and control signals from the cabin lighting controller 116. Thus, while the IR illuminator 240 is separate from the light strip 200, the IR illuminator 240 is enabled to be controlled by the cabin lighting controller 116 and the IR illuminator 240 can also be placed in a same shrouded location as the light strip 200, to enable indirect IR lighting throughout the airplane cabin. While the term "indirect lighting" is generally defined as reflected light, FIGS. 4A and 4B provide a further definition and illustration of indirect lighting/illumination as used herein.

FIG. 2B illustrates a light strip 118 comprising an IR illuminator installed within the housing 202B. In the exemplary embodiment, housing 202B of the light strip 118 has the same form factor of the housing 202A to permit installation of either the light strip 118 or the light strip 200, and avoids a situation depicted in FIG. 2A of using a separate IR illuminator (the IR illuminator 240) in a separate housing (e.g., the housing 242). The light strip 118 comprises a plurality of illuminators within the housing 202B, wherein the plurality of illuminators comprises a first set of spectrally-tuned illuminators 260a. The light strip 118 optionally comprises a second set of spectrally-tuned illuminators 260d, and other sets of spectrally-tuned illuminators 260c and 260b. In the illustrated embodiment, the second set of spectrally-tuned illuminators 260b, the third set of spectrally-tuned illuminators 260c, and the fourth set of spectrally-tuned illuminators 260d, each have the same spectral coverage as the first set of spectrally-tuned illuminators 260c. For clarity, only the first set of spectrally-tuned illuminators 260a is shown in detail.

The first set of spectrally-tuned illuminators 260a comprises an IR illuminator 240 and a first visible light illuminator (e.g., white light illuminator 230a), although a different color can be used in some embodiments. Additionally, the first set of spectrally-tuned illuminators 260a comprises other visible light illuminators having differing colors, for example a red light illuminator 232, a yellow light illuminator 234, a green light illuminator 236, a blue light illuminator 238, and another white light illuminator 230b. Thus, the first set of spectrally-tuned illuminators 260a comprises a plurality of visible light illuminators having differing colors as well as the IR illuminator 240. In some examples, the illuminators 230a, 230b, and 232-240 comprise LEDs.

The light strip 118 can also have an on-board controller 254 and the wire harness 206 that couples to the connector 208 that is, in turn, coupled to the cabin lighting controller 116. The on-board controller 254 can be a microcontroller and/or includes one or more processors that are configured to control operations described herein, such as to control the timing, color, and intensity of LED lights lighting effects emitted from light strip 118. In this example, the cabin lighting controller 116 controls lighting intensity and hue for the light strip 118 and other light strips in the airplane cabin (e.g., the cabin 122 shown in FIG. 1). The wire harness 206 is enabled to couple to the connector 208 without any modification or replacement to the connector 208.

In another example, the on-board controller 254 controls the brightness and hue of the light strip 118, including the IR light intensity, by using PWM. The on-board controller 254 receives control signals from the cabin lighting controller 116, which now controls IR lighting, in addition to visible lighting. Either or both of controllers 116 and 254 may include a processor (e.g., the one or more processors 104 of FIG. 1) to implement control functions. Control signals and electrical power pass through the connector 208 and the wire harness 206, although a different connection scheme can be used, including multiple connectors. The light strip 118 can be powered by DC voltage, for example, between 25 and 32 Volts. The wire harness 206 can be flexible wires, or instead be a rigid connector that fits into the connector 208 when the housing 202B of the light strip 118 is installed in place. In some examples, the housing 202B is flexible, such as a rope light.

As illustrated in FIG. 2B, the light strip 118 further comprises a light sensor 262 coupled to the on-board controller 254. The on-board controller 254 can thus be configured to control a brightness of the IR illuminator 240 in response to a level of light (e.g., sensing an ambient light level) detected by the light sensor 262. For example, the on-board controller 254 increases the PM duty cycle that is powering the IR illuminator 240 when the visible light is below a threshold, such that the VSS camera 121 has sufficient IR illumination to collect video frames that have a same light intensity and/or contrast as video frames collected when the visible light is above the threshold. In some configurations, the VSS camera 121 is coupled to the cabin lighting controller 116, which detects when the VSS camera 121 needs greater illumination and signals the on-board controller 254 to control the IR illumination level according to the needs of the VSS camera 121. In one example, a user defines an intensity level of visible light emitted by the light strip 118 and an intensity level of IR light emitted by the light strip 118.

With reference now to FIG. 3, a detailed illustration of the cabin 122 that can employ indirect lighting for the VSS 120 is shown. The cabin 122 includes a plurality of light strips 118 and/or 200 (shown in FIGS. 1, 2A, and 2B) disposed in shrouded locations 302a, 302b, 304a, 304b, and 306 and are thus depicted with dashed lines as the light strips 118 and/or 200 are advantageously not visible from the perspective shown in FIG. 3. From the shrouded locations 302a, 302b, 304a, 304b, (also shown in FIG. 4A) the light strips 118 and/or 200 provide indirect IR illumination of the cabin 122 via diffuse reflection from a ceiling surface 312 and wall surfaces 314a and 314b. As shown in FIG. 3, the light strips 118 and/or 200 are also disposed in the shrouded location 306 (e.g., as shown in FIG. 4B) to provide indirect IR illumination of the cabin 122 via diffuse reflection from a seat surface 316 (e.g., a side of a seat) or a floor surface 318 of the cabin 122. The light strips 118 and/or 200 can also be disposed in additional locations near the ceiling surface 312, the wall surfaces 314a and 314b, and the floor surface 318.

FIGS. 4A and 4B illustrate various example shrouded locations for locating illuminators for indirect illumination (sometimes referred to as wash lighting) that can be employed in the cabin 122 of FIGS. 1 and 3. In FIG. 4A, the illuminator 240, which may be formed integrally as part of the light strip 118 or may be coupled to the light strip 200 is illustrated in a cross section 400 of the cabin 122 of FIGS. 1 and 3, including a stow bin 404. In FIG. 4A, an illuminator, such as one of the light strips 118 or 200, is disposed to provide indirect IR illumination of the cross section 400 of the cabin 122 via diffuse reflection from a surface of the cross section 400 from locations 302a and 304a, which can be seen in FIG. 4A to be shrouded locations. That is, the light strips 118 and/or 200 are hidden within the shrouded locations 302a and 304a, such that no rays from illuminators on the light strips 118 and/or 200 can go directly from the light strips 118 and/or 200 to the VSS camera 121, which supplies a video signal for VSS 120. Instead, illuminators on the light strips 118 and/or 200 produce a direct ray 406a and 408a, which is then reflected in a diffuse (rather than specular) reflection from a ceiling surface 312 or a wall surface 314a. The diffuse nature of the reflection is illustrated as multiple rays diverging from the point or location where the direct ray the 406a and/or 408a strikes the respective surface. For example, when the direct ray 406a strikes the wall surface 314a, rays 406b, 406c and 406d are reflected and diverge from the point where the direct ray 406a struck the wall surface 314a. Similarly, when the direct ray 408a strikes the ceiling surface 312, rays 408b, 408c and 408d are reflected and diverge from the point where the direct ray 408a struck the ceiling surface 312 The difference between diffuse and specular reflection is that specular reflection occurs when a reflecting surface is smooth relative to the wavelength of the illuminating light (the root-mean-square of the surface variation is below ⅛ of the wavelength), while diffuse reflection occurs when the surface is too rough for specular reflection.

In FIG. 4B, the illuminator 240, which may be formed integrally as part of the light strip 118 or may be coupled to the light strip 200 is illustrated in a cross section 410 of the cabin 122 and disposed to provide indirect IR illumination of the cross section 410 via diffuse reflection from a surface of the cross section 410 from location 306, which can be seen in FIG. 4B to be a shrouded location. One of the light strips 118 or 200 is disposed between the seat surface 316 and a shroud 412. Located in the shrouded location 306, one of the light strips 118 or 200 is disposed to provide indirect IR illumination of the cross section 410 via diffuse reflection from the seat surface 316 and/or the floor surface 318 of the cross section 410. That is, one of light strips 118 or 200 is hidden within the shroud 412 at the shrouded location 306, such that no rays from illuminators on one of the light strips 118 or 200 can go directly from one of the light strips 118 or 200 to the VSS camera 121, which supplies a video signal for VSS 120. Instead, illuminators on one of the light strips 118 or 200 produce direct rays 414a and 412a, which are then reflected in a diffuse (rather than specular) reflection from the seat surface 316 (e.g, side of the seat) and the floor surface 318. The diffuse nature of the reflection is illustrated as multiple rays diverging from a point where the direct ray strikes a surface. For example, when the direct ray 414a strikes the seat surface 316, rays 414b and 414c are reflected and diverge from the point where the direct ray 414a struck the seat surface 316. Similarly, when the direct ray 412a strikes the floor surface 318, rays 412b and 412c are reflected and diverge from the point where the direct ray 412a struck the floor surface 318.

Figure 5A:
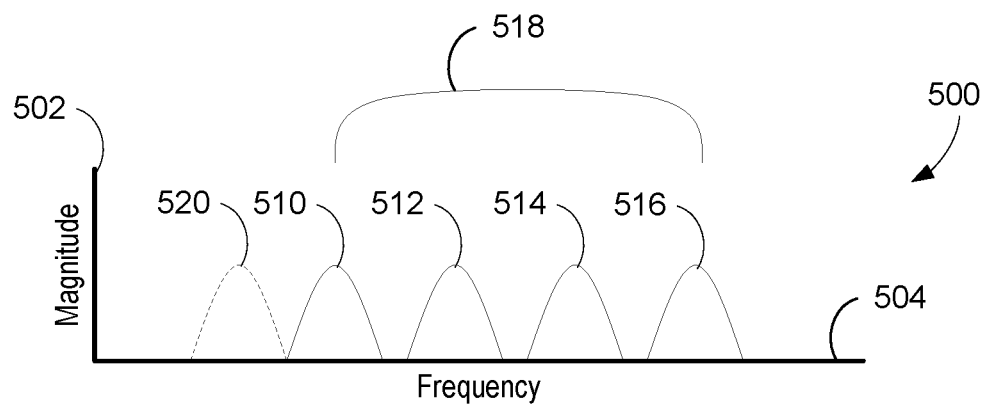
FIGS. 5A and 5B illustrate spectral responses of some of the various example components of the light strips shown in FIGS. 2A and 2B.
Figure 5B:
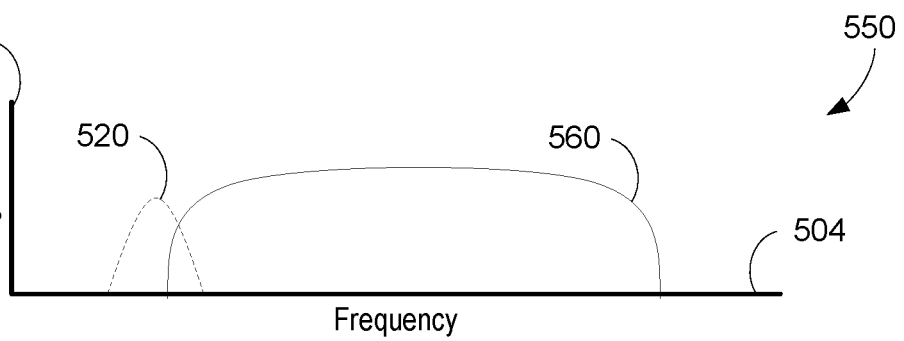

FIGS. 5A and 5B illustrate spectral responses corresponding to colors of some of the various illuminators shown in FIG. 2B. FIG. 5A illustrates a spectral power density graph 500 of illuminators 230a, 232, 234, 236, 238, 230b, 240. In the spectral power density graph 500, a power output of an illuminator is plotted as a curve against a magnitude axis 502, as a function of frequency, along a frequency axis 504. The spectral power density graph 500 shows a first curve 510 indicating spectral power of visible light emitted by a red light illuminator, such as the illuminator 232 shown in FIGS. 2A and 2B. A second curve 512 indicates spectral power of visible light emitted by a yellow light illuminator, such as the illuminator 234, also shown in FIGS. 2A and 2B. A third curve 514 indicates spectral power of visible light emitted by a green light illuminator, such as the illuminator 236, also shown in FIGS. 2A and 2B. A fourth curve 516 indicates spectral power of visible light emitted by a blue light illuminator, such as the illuminator 238, also shown in FIGS. 2A and 2B. An equivalent curve for a white light illuminator (such as the illuminators 230a and 230b, shown in FIGS. 2A and 2B) may occupy a same spectral coverage 518 (e.g., a range of wavelengths) that extends between the first curve 510 through the fourth curve 516. Also shown in FIG. 5A is an IR curve 520 for an IR illuminator, such as illuminator 240, also shown in FIGS. 2A and 2B. Since frequency axis 504 extends from lower frequency values on a left side of the frequency axis 504 to higher frequency values on a right side of the frequency axis 504, the IR curve 520 in FIG. 5A is to the left of the first curve 510.

FIG. 5B illustrates a spectral response graph 550 of a human eye, using the magnitude axis 502 and the frequency axis 504. A human eye can perceive a range of light frequencies denoted by a sensitivity curve 560. As can be seen from the response graph 550, the human eye can perceive the range of light frequencies denoted by the sensitivity curve 560 overlapping somewhat with the IR curve 520. This indicates that some humans can see a glow from an IR illuminator.

FIG. 6 is a flow chart 600 illustrating an exemplary operation of illumination a cabin of a vehicle, for example, a method of illuminating an airplane cabin with a light strip (e.g., one of the light strips 118 or 200 shown in FIGS. 2A and 2B). In operation 602, a plurality of light strips directly illuminate one or more cabin surfaces, for example, a ceiling, a wall, a side of a seat, or a floor. In operation 604, a diffuse reflection from the cabin surfaces indirectly illuminate an interior of the cabin with visible light. In this example, each of the plurality of light strips (e.g., the light strips 118 or 200) comprise a plurality of visible light illuminators, and either include (e.g., with the light strip 118) or are coupled to (e.g., with the light strip 200) an IR illuminator. In operation 606, lighting intensity for the visible light illuminators is set by controlling the brightness of the illuminators (e.g., the illuminators 230a, 232, 234, 236, 238, 230b,) by the cabin lighting controller 116. In one example, the lighting intensity is controlled based on an amount of ambient light in the cabin, a time of day, or user preferences.

At operation 608, a light sensor signal is available, such as from a light sensor or a VSS measurement, and operation 610 includes sensing a light level with the light sensor (e.g., the light sensor 262) coupled to a controller (e.g., controller 254 or 116). Thus, a cabin lighting controller (e.g., the cabin lighting controller 116) or an on-board controller (e.g., controller 254) controls a brightness of visible light illuminating from the visible light illuminators. Operation 612 involves controlling, with the controller, a brightness of the illuminators (including the IR illuminators) for each of the plurality of light strips in response to a level of light sensed by the light sensor or based on input from a user. Initially, IR light from the light strips directly illuminate a cabin surface in operation 614, for example, a ceiling, a wall, the side of a seat, or the floor. In operation 616, a diffuse reflection from the cabin surface indirectly illuminates an interior of the cabin with IR light. This permits a VSS (e.g., the VSS 120) to conduct video surveillance with the IR light, in operation 618. In one example, the controller can instruct each of the IR illuminators to emit IR light at a same intensity/brightness to enable an even distribution of IR light throughout the interior of the cabin. In another example, the controller can increase an intensity/brightness of a subset of the IR illuminators while also decreasing an intensity/brightness of another subset (e.g., the remaining IR illuminators), which enables IR lighting to be focused on a particular portion of the interior the cabin.

Combining flow chart 600 with the light strips 118 and 200 of FIGS. 2A and 2B, and the installation locations illustrated in FIGS. 3, 4A and 4B, it can be seen that illuminating an airplane cabin with IR light includes indirectly illuminating the airplane cabin with IR light via diffuse reflection from a surface of the airplane from a light strip disposed in a shrouded location. The surface can be any of a ceiling surface, a wall surface, a seat surface, and a floor. The IR illuminator (e.g. LED) is controlled by a controller (e.g., the cabin lighting controller 116), according to the illumination needs of a VSS.

Figure 7:
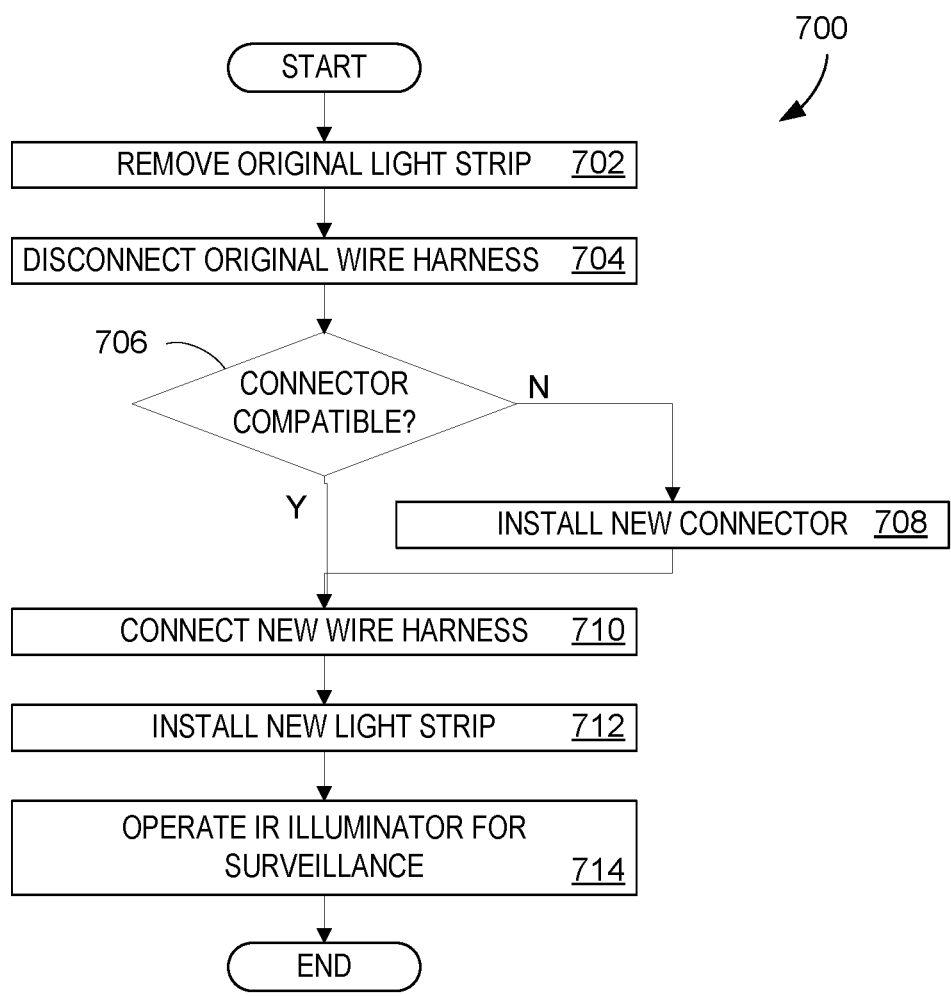
FIG. 7 is a flow chart illustrating an operation of augmenting interior lighting for an airplane the airplane cabin of FIG. 3.

FIG. 7 is a flow chart 700 illustrating an operation of augmenting interior lighting for an airplane cabin. The flow chart 700 illustrates a scenario of replacing a light strip (e.g., a light strip the does not include an IR illuminator, with a light strip that includes an IR illuminator (e.g., the light strip 118 in FIG. 2B) in the airplane cabin. At operation 702, an existing light strip is removed. In one example, the existing light strip does not include an IR illuminator. At operation 704, an existing wire harness coupled to the existing light strip is disconnected. At operation 706, it is determined whether an existing connector is compatible with a new wire harness of a new light strip comprising an IR illuminator and one or more visible light illuminators. If the new wire harness is not compatible, at operation 708, a new connector is installed or the existing connected is modified such that the new wire harness is compatible with the existing connector, and the operation continues to operation 710. If the new wire harness is compatible, at operation 710, the new wire harness is connected to the connector. At operation 712, the new light strip is installed. At operation 714, the new light strip is operated with the same controller(s) that controlled the previously installed light strip, for example, the cabin lighting controller 116.

An exemplary system provided herein is a system for illuminating an airplane cabin. The system comprises: a light strip comprising a plurality of illuminators within a housing, wherein the plurality of illuminators comprises a first set of spectrally-tuned illuminators, and wherein the first set of spectrally-tuned illuminators comprises a first visible light illuminator and an IR illuminator, and wherein the light strip is disposed to provide indirect IR illumination of the cabin via diffuse reflection from a surface of the cabin from a shrouded location.

An exemplary method provided herein is a method of illuminating an airplane cabin. The method comprises: indirectly illuminating the cabin with IR light via diffuse reflection from a surface of the cabin from a light strip disposed in a shrouded location, wherein the surface comprises at least one selected from the list consisting of: a ceiling surface, a wall surface, a seat surface, and a floor; wherein the light strip comprises a plurality of LEDs within a housing, wherein the plurality of LEDs comprises a plurality of sets of spectrally-tuned LEDs, and wherein each set of spectrally-tuned LEDs comprises a white LED, at least two differently-colored LEDs, and an IR LED; wherein the light strip further comprises a controller configured to control a brightness of each of the white LEDs, the colored LEDs, and the IR LEDs with PWM, according to the illumination needs of a VSS.

Another exemplary method provided herein is a method of replacing an illuminating source in an airplane cabin. The method comprises: removing an existing light strip, disconnecting an existing wire harness, determining whether an existing connector is compatible with a new wire harness of a new light strip comprising an IR illuminator, based on the existing connector not being compatible with the new wire harness, installing a new connector, connecting the new wire harness to the connector, installing the new light strip, and operating the IR illuminator of the new light strip according to the illumination needs of a VSS.

The foregoing exemplary system and methods include any combination of the following: the illuminators comprise LEDs; the housing is flexible; the light strip further comprises a second set of spectrally-tuned illuminators; the second set of spectrally-tuned illuminators has a same spectral coverage as the first set of spectrally-tuned illuminators; the first visible light illuminator comprises a while light illuminator; the first set of spectrally-tuned illuminators comprises a plurality of visible light illuminators having differing colors; the plurality of visible light illuminators comprises at least two selected from the list consisting of a red light illuminator, a yellow light illuminator, a green light illuminator, and a blue light illuminator; the light strip further comprises a controller; the controller is configured to control a brightness of the first visible light illuminator PWM and to control a brightness of the IR illuminator with PWM according to the illumination needs of a VSS; the light strip further comprises a light sensor coupled to the controller, wherein the controller is configured to control a brightness of the IR illuminator in response to a level of light sensed by the light sensor; the light strip is disposed to provide indirect IR illumination of the cabin via diffuse reflection from a ceiling surface of the cabin; the light strip is disposed to provide indirect IR illumination of the cabin via diffuse reflection from a wall surface of the cabin; and the light strip is disposed to provide indirect IR illumination of the cabin via diffuse reflection from a seat surface or floor of the cabin.

The examples illustrated and described herein, as well as examples not specifically described herein but within the scope of aspects of the disclosure, constitute exemplary means for providing indirect IR illumination of a cabin. The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

The following paragraphs describe further aspects of the disclosure:

A1. A system for illuminating a cabin, the system comprising:

a light strip comprising a plurality of illuminators within a housing, wherein the plurality of illuminators comprises a set of spectrally-tuned illuminators, and wherein the set of spectrally-tuned illuminators comprises a visible light illuminator and an IR illuminator; and wherein the light strip is disposed to provide indirect IR illumination of the cabin via diffuse reflection from a surface of the cabin from a shrouded location.

A2. The system of claim 1, wherein the plurality of illuminators comprise light emitting diodes (LEDs).

A3. The system of claim 1, wherein the cabin is an airplane cabin.

A4. The system of claim 1, wherein the light strip further comprises a second set of spectrally-tuned illuminators.

A5. The system of claim 4, wherein the second set of spectrally-tuned illuminators has a same spectral coverage as the set of spectrally-tuned illuminators.

A6. The system of claim 1, wherein the visible light illuminator comprises a white light illuminator.

A7. The system of claim 1, wherein the set of spectrally-tuned illuminators comprises a plurality of visible light illuminators having differing colors.

A8. The system of claim 7, wherein the plurality of visible light illuminators comprises at least two or more of the following: a red light illuminator, a yellow light illuminator, a green light illuminator, and a blue light illuminator.

A9. The system of claim 1, wherein the light strip further comprises a controller.

A10. The system of claim 9, wherein the controller is configured to control a brightness of the visible light illuminator with pulse width modulation (PWM) and to control a brightness of the IR illuminator with PWM.

A11. The system of claim 9, wherein the light strip further comprises a light sensor coupled to the controller, wherein the controller is configured to control a brightness of the IR illuminator in response to a level of light sensed by the light sensor.

A12. The system of claim 1, wherein the light strip is disposed to provide indirect IR illumination of the cabin via diffuse reflection from one or more of the following: a ceiling surface of the cabin, a wall surface of the cabin, a floor of the cabin, and a surface of a seat in the cabin.

A13. The system of claim 1, further comprising a controller configured to control a brightness of the plurality of illuminators.

A14. The system of claim 13, further comprising a second light strip comprising a second plurality of illuminators, and wherein the controller is further configured to separately control the brightness of the plurality of illuminators and the second plurality of illuminators.

A15. A method of illuminating a cabin, the method comprising:

indirectly illuminating the cabin with IR light via diffuse reflection from a surface of the cabin from a light strip disposed in a shrouded location, wherein the surface comprises one or more of the following: a ceiling surface, a wall surface, a seat surface, and a floor surface, wherein the light strip comprises a plurality of light emitting diodes (LEDs) within a housing, wherein the plurality of LEDs comprises a plurality of sets of spectrally-tuned LEDs, and wherein each set of spectrally-tuned LEDs comprises an IR LED and one or more of the following: a white LED and at least two differently-colored LEDs; and receiving, from a controller, instructions to control a brightness of each of the plurality of LEDs.

A16. The method of claim 15, further comprising controlling the brightness of each of the plurality of LEDs with pulse width modulation (PWM).

A17. The method of claim 15, further comprising:

sensing a light level with a light sensor coupled to the controller, and controlling, with the controller, a brightness of the IR LEDs in response to a level of light sensed by the light sensor.

A18. A cabin comprising:

a plurality of light strips, each of the plurality of light strips comprising a plurality of illuminators within a housing, wherein the plurality of illuminators comprises a set of spectrally-tuned illuminators, and wherein the set of spectrally-tuned illuminators comprises a visible light illuminator and an IR illuminator; and wherein each of the plurality of light strips is disposed to provide indirect IR illumination of an interior of the cabin via diffuse reflection from one or more surfaces in the interior of the cabin from a shrouded location.

A19. The cabin of claim 18, wherein the cabin is an airplane cabin.

A20. The cabin of claim 18, wherein the one or more surface comprises one or more of the following: a ceiling surface of the cabin, a wall surface of the cabin, a floor of the cabin, and a surface of a seat in the cabin.

When introducing elements of aspects of the disclosure or the examples thereof, the articles "a", "an", "the", and "said" are intended to mean that there are one or more of the elements. The terms "comprising", "including", and "having" are intended to be inclusive and mean that there may be additional elements other than the listed elements. The term "exemplary" is intended to mean "an example of". The phrase "one or more of the following: A, B, and C" means "at least one of A and/or at least one of B and/or at least one of C".

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for illuminating a cabin, the system comprising:
 a light strip comprising a plurality of illuminators within a housing, wherein the plurality of illuminators comprises a set of spectrally-tuned illuminators, and wherein the set of spectrally-tuned illuminators comprises a visible light illuminator and an infrared illuminator; and
 wherein the light strip is disposed to provide indirect infrared illumination of the cabin by providing rays directly from the light strip to a surface of the cabin causing an initial diffuse reflection, the initial diffuse reflection being from the surface of the cabin from a shrouded location.

2. The system of claim 1, wherein the plurality of illuminators comprise light emitting diodes (LEDs).

3. The system of claim 1, wherein the cabin is an airplane cabin.

4. The system of claim 1, wherein the light strip further comprises a second set of spectrally-tuned illuminators.

5. The system of claim 4, wherein the second set of spectrally-tuned illuminators has a same spectral coverage as the set of spectrally-tuned illuminators.

6. The system of claim 1, wherein the visible light illuminator comprises a white light illuminator.

7. The system of claim 1, wherein the set of spectrally-tuned illuminators comprises a plurality of visible light illuminators having differing colors.

8. The system of claim 7, wherein the plurality of visible light illuminators comprises at least two or more of the following: a red light illuminator, a yellow light illuminator, a green light illuminator, and a blue light illuminator.

9. The system of claim 1, wherein the light strip further comprises a controller.

10. The system of claim 9, wherein the controller is configured to control a brightness of the visible light illuminator with pulse width modulation (PWM) and to control a brightness of the infrared illuminator with PWM.

11. The system of claim 9, wherein the light strip further comprises a light sensor coupled to the controller, wherein the controller is configured to control a brightness of the infrared illuminator in response to a level of light sensed by the light sensor.

12. The system of claim 1, wherein the light strip is disposed to provide indirect infrared illumination of the cabin via diffuse reflection from one or more of the following: a ceiling surface of the cabin, a wall surface of the cabin, a floor of the cabin, and a surface of a seat in the cabin.

13. The system of claim 1, wherein the light strip is disposed to provide indirect infrared illumination of the cabin by providing the rays directly from the light strip to the surface of the cabin causing the initial diffuse reflection, wherein the surface is one or more of the following: a wall surface of the cabin, a floor of the cabin, and a surface of a seat in the cabin.

14. The system of claim 13, further comprising a second light strip comprising a second plurality of illuminators, and wherein a controller is configured to separately control a brightness of the plurality of illuminators and the second plurality of illuminators.

15. A method of illuminating a cabin, the method comprising:
 indirectly illuminating the cabin with infrared light by:
  providing direct rays from a light strip to a surface of the cabin, the light strip being disposed in a shrouded location;
  causing an initial diffuse reflection, the initial diffuse reflection resulting from the surface of the cabin receiving the direct rays from the light strip disposed in the shrouded location, wherein the surface comprises one or more of the following: a ceiling surface, a wall surface, a seat surface, and a floor surface, wherein the light strip comprises a plurality of light emitting diodes (LEDs) within a housing, wherein the plurality of LEDs comprises a plurality of sets of spectrally-tuned LEDs, and wherein each set of spectrally-tuned LEDs comprises an infrared LED and one or more of the following: a white LED and at least two differently-colored LEDs; and
  receiving, from a controller, instructions to control a brightness of each of the plurality of LEDs.

16. The method of claim 15, further comprising controlling the brightness of each of the plurality of LEDs with pulse width modulation (PWM).

17. The method of claim 15, further comprising:
 sensing a light level with a light sensor coupled to the controller, and
 controlling, with the controller, a brightness of the infrared LED in response to a level of light sensed by the light sensor.

18. A system for illuminating an airplane cabin, the system comprising:
 a light strip comprising a plurality of light emitting diodes (LEDs) within a housing, wherein the plurality of LEDs comprises a plurality of sets of spectrally-tuned LEDs, and wherein each set of spectrally-tuned LEDs comprises a white LED, at least two differently-colored LEDs, and an infrared LED;
 wherein the light strip further comprises a controller configured to control a brightness of each of the white LEDs, the differently-colored LEDs, and the infrared LED with pulse width modulation (PWM); and
 wherein the light strip is disposed to provide indirect infrared illumination of the cabin by providing rays directly from the light strip to a surface of the cabin from a shrouded location causing an initial diffuse reflection, the initial diffuse reflection resulting from the rays striking the surface of the cabin from the shrouded location, and wherein the surface comprises at least one selected from the list consisting of: a ceiling surface, a wall surface, a seat surface, and a floor.

19. The system of claim 18, wherein the housing is flexible.

20. The system of claim 18, wherein the light strip further comprises:
 a light sensor coupled to the controller, wherein the controller is configured to control a brightness of the infrared LED in response to a level of light sensed by the light sensor.